United States Patent [19]

Hubred et al.

[11] Patent Number: 5,350,533
[45] Date of Patent: Sep. 27, 1994

[54] PAVEMENT DEICER COMPOSITIONS

[75] Inventors: Gale L. Hubred, Brea; Harold E. Todd, Pinole, both of Calif.

[73] Assignee: General Atomics International Services Corporation, San Diego, Calif.

[21] Appl. No.: 9,277

[22] Filed: Jan. 26, 1993

[51] Int. Cl.$^5$ .................................................. C09K 3/18
[52] U.S. Cl. ....................................... 252/70; 252/76; 252/79; 106/13
[58] Field of Search ....................... 252/70, 75, 79, 74; 106/13; 427/220

[56] References Cited

U.S. PATENT DOCUMENTS

| | | | |
|---|---|---|---|
| 2,233,185 | 2/1941 | Smith | 252/76 |
| 4,338,209 | 7/1982 | Manabe et al. | 252/75 |
| 4,377,488 | 3/1983 | Gancy | 252/70 |
| 4,824,588 | 4/1989 | Lin | 252/70 |
| 4,855,071 | 9/1989 | Todd, Jr. et al. | 252/70 |
| 5,064,551 | 11/1991 | Smith | 252/70 |
| 5,127,954 | 7/1992 | Johnston et al. | 106/644 |
| 5,132,035 | 7/1992 | Hoenke et al. | 252/70 |

FOREIGN PATENT DOCUMENTS 2054840  5/1992  Canada .

Primary Examiner—Paul Lieberman
Assistant Examiner—Necholus Ogden
Attorney, Agent, or Firm—Fitch, Even, Tabin & Flannery

[57] ABSTRACT

Liquid deicing and anti-icing compositions are provided by aqueous solutions of (a) alkali metal acetates, e.g., KAc or NaAc, (b) phosphate ion, e.g., $K_3PO_4$, and (c) soluble silicate, e.g., $K_2SiO_3$ or $Na_2SiO_3$. These compositions are environmentally safe and meet FAA standards for metal corrosion resistance. They are effective at very low temperatures, e.g. $-40°$ F., and provide particularly effective deicing compositions when used in combination with granular CMA.

7 Claims, No Drawings

PAVEMENT DEICER COMPOSITIONS

FIELD OF THE INVENTION

The present invention relates to deicing compositions suitable for use on pavements, such as airport runways and other roadway surfaces.

BACKGROUND

Currently available surface deicing compositions use rock salt and other such corrosive materials. Glycol-based formulations, urea-containing formulations, and methanol-containing formulations have been proposed and used for airplane runways. However, these formulations are toxic, corrosive to metals, and often flammable.

U.S. Pat. No. 5,064,551 to Smith teaches acetate and formate solutions for use as deicers which include metal corrosion inhibitors in the form of phosphates and nitrates and include EDTA as a surfactant. It is felt that such compositions not only fail to provide adequate overall metal protection, but the inclusion of nitrates is considered potentially damaging to the environment. Calcium magnesium acetate (CMA) granular materials, such as those disclosed in U.S. Pat. No. 4,913,831, are environmentally acceptable compositions for deicing but do not act instantly.

There remains a need for effective, environmentally acceptable deicing solutions for use on road surfaces, particularly airplane runway surfaces, which are non-toxic, nonflammable, and essentially noncorrosive to metals. Because deicing formulations dispersed on runways are often ultimately washed into a storm drain system or a waterway, it is important that the solution be nontoxic to the environment, particularly aquatic life. It is also important that such deicing formulations be able to function well in a variety of weather conditions, both as a deicer to remove accumulated ice and snow, and as an anti-icer, to prevent ice formation on a runway. It is further important that such deicing formulations are not slippery, when applied to a runway surface or the like, otherwise they could undesirably reduce the traction of the surface for aircraft and other vehicles. It is an object of the present invention to provide effective surface deicers, particularly suitable for airport runways, which can be easily applied, act quickly, are nonslippery, and are effective over a wide range of temperatures and weather conditions.

SUMMARY OF THE INVENTION

The present invention provides effective deicing and anti-icing liquid compositions which are essentially noncorrosive to metals as well as environmentally benign. These liquid compositions are particularly suitable for use in deicing airport runways. The compositions of the present invention are aqueous solutions of alkali metal acetates, together with a corrosion inhibitor package which includes phosphate ion, preferably in the form of an alkali metal phosphate, and soluble silicates, preferably in the form of an alkali metal silicate. These compositions have also proved to be particularly effective when they are applied together with CMA.

DETAILED DESCRIPTION OF PREFERRED EMBODIMENTS

Unless defined otherwise, all technical and scientific terms used herein have the same meaning as is commonly understood by one of skill in the art to which this invention belongs.

As used herein the term "deicing composition" refers to a composition which acts to remove ice from surfaces on which the ice has already formed. As used herein the term "anti-icing composition" refers to a composition which is applied to a surface that is not yet covered with ice and is effective to prevent water on such surface from freezing to form ice.

The present invention provides liquid compositions which are effective both as deicing and anti-icing liquids. These compositions are easily applied, fast-acting, environmentally benign, nontoxic to humans, and essentially noncorrosive to metals. These compositions contain an aqueous solution of an alkali metal acetate in combination with a corrosion inhibitor package which includes at least one source of phosphate ion, preferably potassium phosphate, and at least one soluble silicate.

The compositions of the present invention contain between about 40 and 60 weight percent of alkali metal acetate in aqueous solution. Alkali metal acetates include potassium acetate, sodium acetate, and lithium acetate, all of which are highly soluble in water. Preferred alkali metal acetates are potassium acetate and sodium acetate, which are readily commercially available. The most preferred alkali metal acetate is potassium acetate (KAc), which is soluble up to about 2000 grams per liter of water at room temperature. Preferred concentrations of potassium acetate are between about 50 to about 60 weight percent, which concentrations advantageously have a depressed freezing point of about $-40°$ C. or below.

The compositions of the present invention contain a corrosion inhibitor package of additives which are nontoxic to the environment. In combination, these additives provide essential metal corrosion protection for aircraft and ground vehicles. This corrosion inhibitor combination is very effective at very low concentrations, that is, 1.0 weight percent or less of the total composition containing about 50 weight percent KAc or the like. In addition to providing excellent metal corrosion protection, this inhibitor package retards biodegradation of the concentrated form of the deicing composition while not having any significant undesirable effect as a result of the components individually once dilution has occurred.

A major additive included in the corrosion inhibitor package is phosphate ion, which is present in final concentration in a quantity of at least about 200 parts per million (ppm), or 0.02 weight percent (1 part per million is equal to 0.0001 weight percent). Phosphate ion may be present at higher levels, such as about 10,000 parts per million (1.0 weight percent), or even up to the limits of its solubility, if desired; however such is considered unnecessary to achieve the desired effect.

Preferably, phosphate ion is present in quantities of greater than about 500 ppm and less than about 10,000 ppm, and most preferably between approximately about 900 ppm and about 1200 ppm. Phosphate ions are provided in the compositions of the present invention by the addition of alkali metal phosphates or phosphoric acid. Suitable alkali metal phosphates include sodium and potassium phosphates, and either may be used in the mono, di, and tri-basic form, which are all commonly commercially available. The preferred source of phosphate is tribasic potassium phosphate ($K_3PO_4$), which is extremely soluble in water (up to approximately 43.7 weight percent in 0° C. water); about 2200 ppm of $K_3PO_4$ is equal to about 1000 ppm of phosphate ion.

The second additive present in the corrosion inhibitor package is one or more soluble silicates, preferably alkali metal silicates. Soluble silicates are present in final concentration in the deicing compositions at concentrations of at least about 50 ppm, and they may be present at substantially higher levels. Soluble silicates are preferably provided by alkali metal silicates, but they may also be provided by silicic acid, $H_4SiO_4$. Preferred soluble silicates are alkali metal silicates, particularly soluble sodium silicates and soluble potassium silicates.

Sodium silicates, known as water glass or soluble glass, are commonly available as a mixture of the forms $Na_2SiO_3$, $Na_6Si_2O_7$, and $Na_2Si_3O_7$. Some potassium silicates are known as soluble potash glass or soluble potash water glass, and they have a variable composition of a mixture of the forms $K_2Si_2O_5$ and $K_2Si_3O_7$, $K_2SiO_3$ being commercially available. Preferably either $Na_2SiO_3$, which in its anhydrous form is known as metasilicate, or $K_2SiO_3$ is used as the source of the soluble alkali metal silicates.

The soluble silicate additives are generally present in concentrations of at least about 50 ppm, preferably between about 100 ppm and about 800 ppm, and most preferably about 200 ppm to about 400 ppm. However, soluble silicates may be present up to the limits of solubility of the silicate molecule, if desired for certain conditions.

The compositions of the present invention are preferably maintained within a pH range of about 10 to about 12. Generally, the pH of the final solution is adjusted to approximately 11, plus or minus one pH unit, with the hydroxide of the same alkali metal used in the alkali metal acetate of the composition. A pH in this range contributes to the advantageous prevention of growth of bacteria and other microbes in the acetate solution; however, compositions having pH values lower than 10 are also effective for deicing.

The compositions of the present invention are clear, colorless solutions, which are nonflammable. The compositions when applied to a roadway surface are non-slippery and do not reduce the traction of the surface. None of the ingredients of this composition are considered toxic to the environment or to human health. Because these compositions are nonhazardous, they may be transported and stored without special restrictions, and their storage containers may be disposed of in a normal landfill. Most importantly, these compositions readily break down in the natural environment without any significant adverse effects. For example, it has been shown that a quantity of a preferred deicing composition containing about 50 weight percent potassium acetate, about 2200 ppm $K_3PO_4$, and about 200 ppm $K_2SiO_3$, pH about 11, becomes approximately 50% biodegraded at 4° C. within five days, and approximately 80% biodegraded at 20° C. within 5 days, when subjected to standard test conditions. The lack of toxicity and ability to biodegrade even at low temperatures is particularly important, for it is most likely that these deicing compositions will eventually be washed from the pavement surface into storm drains or directly into aquatic systems. Moreover, the composition is considered to have substantially lower Biological Oxygen Demand (BOD) requirements than comparable deicers.

The compositions of the present invention may be advantageously used both as a deicing liquid to remove ice from a surface, and as an anti-icing liquid, for prevention of ice formation on a surface. As a deicing liquid, the amount required to effectively remove ice already formed on a surface is determined by both the ambient temperature and the quantity of ice present. The lower the air temperature, and the thicker the ice, the greater will be the amounts of deicing liquid required to sufficiently clear the surface of ice or snow; however, the composition exhibits an advantageously short thawing time. Moreover, it is considered to be particularly effective at very low temperatures, e.g. capable of quickly melting one-half inch of ice at −40° F. As an anti-icing composition, the liquids of the present invention are applied, prior to the formation of ice, in concentrations sufficient to prevent freezing at the roadway surface. Generally, a lesser amount of liquid is required to prevent ice formation than to clear a surface where ice has already formed.

The quantity of a preferred deicing composition desirably used to clear ice or to prevent ice formation will vary with ambient air temperature and, in the former situation, with the depth of packed snow and ice. As an example, Table 1 herebelow tabulates the amounts of a preferred composition containing about 50 weight percent potassium acetate, about 2200 ppm $K_3PO_4$, and about 200 ppm $K_2SiO_3$, which has a pH of about 11, that should be used to prevent ice formation on a pavement surface or to remove snow and ice.

TABLE 1

| | DEICING | | |
|---|---|---|---|
| Packed Snow & Ice Depth, Inches | Air Temperature 20° F.–32° F. | Air Temperature 10°–20° F. | Air Temperature Less than 10° F. |
| 2 to 3 | 3.7 gal/1000 ft² | 4.6 gal/1000 ft² | 9.1 gal/1000 ft² |
| 1 to 2 | 1.8 gal/1000 ft² | 2.7 gal/1000 ft² | 6 gal/1000 ft² |
| ½ to 1 | 1.2 gal/1000 ft² | 1.8 gal/1000 ft² | 3 gal/1000 ft² |
| Less than ½ | .9 gal/1000 ft² | 1.2 gal/1000 ft² | 1.8 gal/1000 ft² |
| Glare Ice | .9 gal/1000 ft² | 1.2 gal/1000 ft² | 1.8 gal/1000 ft² |

| ANTI-ICING | |
|---|---|
| Runway Condition | Application Rate in Gallons/1000 ft² |
| Expecting general subfreezing precipitation or icing conditions | ¼ gal |
| Expecting freezing rain | ½ gal |

It may be seen from Table 1 that approximately 7 to 30 times the amount of the preferred composition is usually applied to remove accumulated snow or ice than to prevent ice formation. Therefore, it can be seen that it is more effective to apply these deicing compositions before freezing occurs. Alternatively, the composition can be applied together with granular CMA, as discussed hereinafter, a combination which has proved to be extremely effective.

The frequency of application required for these liquid compositions is determined by the amount of dilution of the applied compositions due to additional snow or rain and by the ambient temperature. As the applied liquids are diluted by precipitation, the freezing point of the compositions increases. For example, the freezing point of a solution of 50 weight percent of potassium acetate solution is approximately −40° C., whereas the freezing point of a 40 weight percent solution is approximately −20° C., while the freezing point of a 10 weight percent solution is approximately −10° C. Therefore, the frequency of application will depend upon the ambient temperature of the air and pavement as well as upon the amount of precipitation occurring subsequent to the application of the compositions; however, the composition exhibits the ability to keep working longer than other commercial deicers and thus requires less frequent applications.

The compositions of the present invention are typically applied using a spray dispenser from a tank truck or a bulk drum, such as that employed in an agricultural sprayer or water truck, for example. The spray equipment employed should be capable of applying the compositions at a density of approximately 1 to 3 gallons per thousand square feet.

The compositions of the present invention may advantageously shipped in bulk, using tank trucks, tank cars, mini-bulk containers, steel drums and the like. Because these compositions are nonhazardous, they may be stored in containers made of polyethylene, stainless steel, lacquer-lined mild steel, or glass.

In addition to its performance capabilities and its very favorable environmental properties as discussed above, the compositions resulting from this combination of acetates, phosphates and silicates are extremely low in metal corrosiveness. The preferred composition of the deicer easily meets the standards established under AMS-1432. Moreover, tests for metal corrosiveness were carried out at both 20° C. and 50° C. using compositions which ranged in potassium acetate content from about 10% to about 50%. Under all of these test conditions, the preferred composition showed excellent results and has been approved by the FAA for use on airport runways, taxiways, etc. throughout the United States. Moreover, comparison testing with the preferred compositions disclosed in the '551 patent to Smith, using cast iron, carbon steel, copper and yellow brass, showed very substantial improvements in corrosion resistance; both dilute and concentrated versions of the preferred composition showed levels of corrosion substantially less than one-half that of the Smith patent composition in these tests with each of the aforementioned metals. The fact that the preferred composition easily meets the specifications of the Federal Aeronautics Administration (FAA) and also the United States Air Force interim specifications for runway deicing makes this product particularly valuable for use in commercial airports and military bases.

Although the deicing/anti-icing compositions of the present invention are very effective when applied alone, these are advantages in applying them in combination with other granular deicing materials. For example, the deicing compositions are extremely effective when applied together with solid calcium magnesium acetate salt (CMA), which is described in detail in U.S. Pat. No. 4,913,831, the disclosure of which is incorporated herein by reference. CMA salts are preferably first applied to the roadway or airport runway surface in the form of solid pellets, or possibly as a slurry. The liquid compositions of the present invention are sprayed on top of the CMA granular or slurry materials, and they have been found to particularly enhance the deicing and, under many condition, to give rise to a synergistic effect. The liquid deicing compositions may also be applied on roadways in conjunction with traction aids, such as sand, lime, or other similar materials, if desired.

Although the compositions of the present invention have been described with reference to the presently-preferred embodiments, it is understood that various modifications can be made without departing from the scope of the invention which is limited only by the following claims. Particular features of the invention are emphasized in the claims which follow.

What is claimed is:

1. An environmentally benign liquid deicing or anti-icing aqueous composition useful for deicing airplane runways consisting essentially of an aqueous solution containing about 40 to about 60 weight percent of potassium acetate and containing in an amount of about 1 weight percent or less of said total composition about 2200 parts per million (ppm) phosphate ion; and about 100–800 ppm soluble potassium or sodium silicates.

2. The composition of claim 1 having a pH value in the range of about 10 to about 12.

3. The composition of claim 2 which contains about 50 weight percent potassium acetate, about 2200 ppm $K_3PO_4$, and about 200 $K_2SiO_3$.

4. A method of deicing roadway surfaces comprising applying an effective amount of an aqueous deicing composition to said surfaces, which deicing composition comprises an aqueous solution of about 40 to about 60 weight percent alkali metal acetate and containing in an amount of about 1 weight percent or less of said total composition; at least about 900 ppm phosphate ion; and about 100–800 ppm alkali metal silicates.

5. The method of claim 4 wherein said alkali metal acetate is potassium acetate, said alkali metal silicate is potassium silicate, and said composition has a pH value of between 10 to 12.

6. The method of claim 5 wherein said deicing composition comprises an aqueous solution of about 50 weight percent of potassium acetate, about 2200 ppm $K_3PO_4$, and about 200 ppm $K_2SiO_3$.

7. The method of claim 4 wherein said deicing composition is applied to the roadway surface in combination with an effective amount of granular calcium magnesium acetate.

* * * * *

UNITED STATES PATENT AND TRADEMARK OFFICE
CERTIFICATE OF CORRECTION

PATENT NO. : 5,350,533

DATED : September 27, 1994

INVENTOR(S) : Hubred, et al.

It is certified that error appears in the above-identified patent and that said Letters Patent is hereby corrected as shown below:

IN THE CLAIMS: Column 6, Claim 3, line 30, after "200", insert --ppm--.

Signed and Sealed this

Seventh Day of March, 1995

Attest:

BRUCE LEHMAN

Attesting Officer

Commissioner of Patents and Trademarks